Nov. 8, 1932. O. E. LAW 1,887,208
DIFFERENTIAL POWER TRANSMISSION MECHANISM
Filed Dec. 18, 1930 3 Sheets-Sheet 1
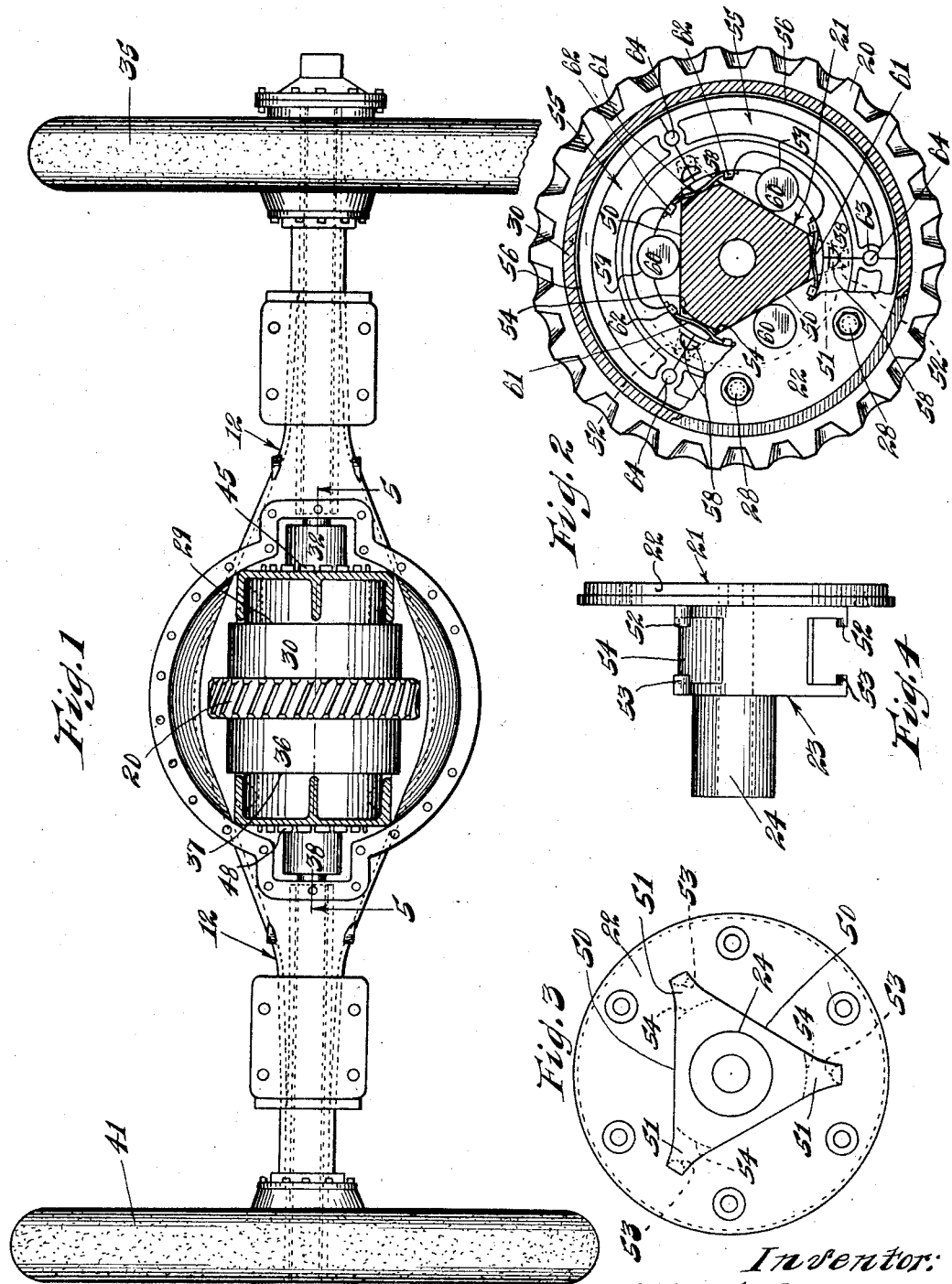
Witnesses:
C. E. Weasels
F. C. Appleton
Inventor:
Otis E. Law,
By Joshua R. H. Roth
his Attorney.

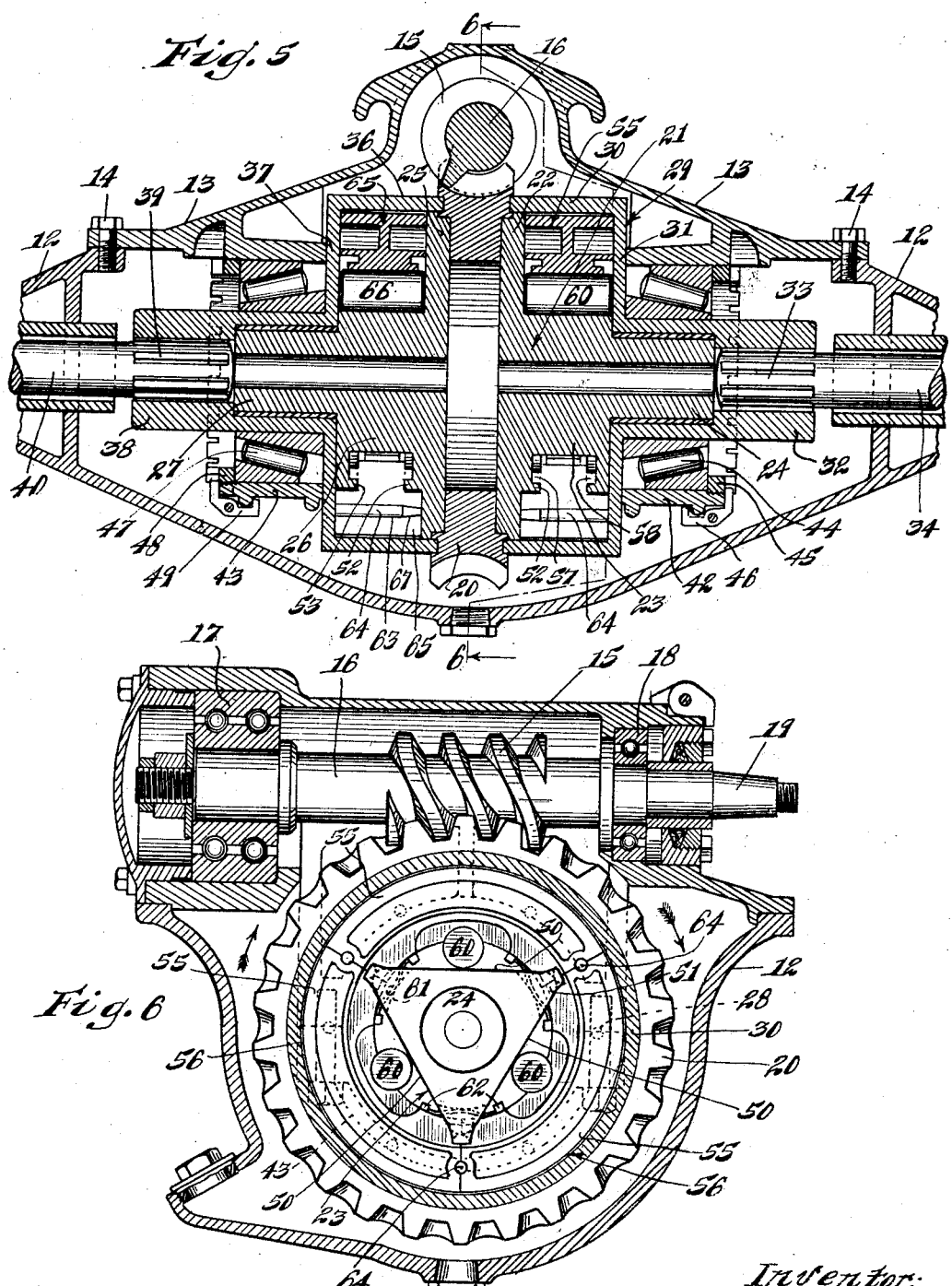

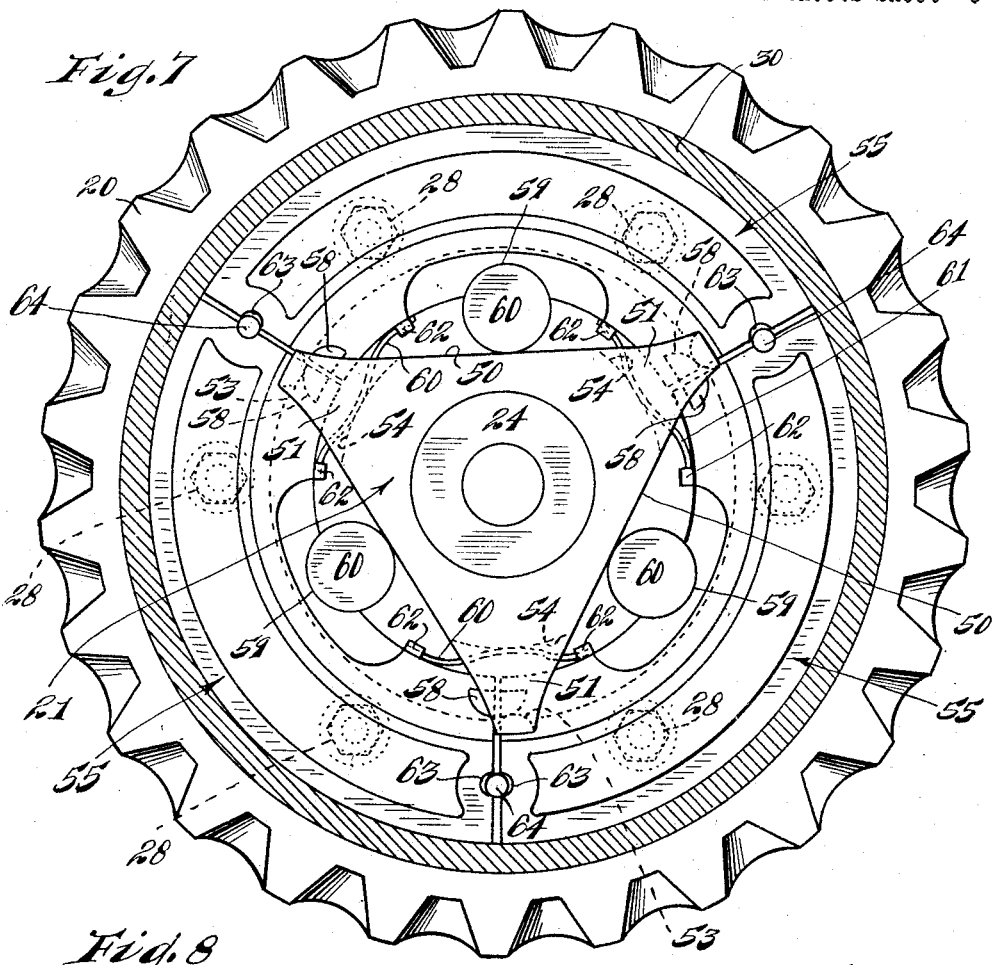

Patented Nov. 8, 1932

1,887,208

UNITED STATES PATENT OFFICE

OTIS E. LAW, OF BROOKFIELD, ILLINOIS, ASSIGNOR, BY DIRECT AND MESNE ASSIGN-
MENTS, TO ALLEN FREE-WHEELING CORPORATION, OF CHICAGO, ILLINOIS, A COR-
PORATION OF ILLINOIS

DIFFERENTIAL POWER TRANSMISSION MECHANISM

Application filed December 18, 1930. Serial No. 503,152.

This invention relates to a differential power transmission mechanism, and more particularly to mechanism of this character applicable to a motor vehicle. An object of the invention is the provision of a power transmission mechanism interposed between the main drive shaft of a motor vehicle and the divided axle shafts constructed and arranged to compensate for the variation in speed between the driven wheels of the vehicle when following a curved path of travel, and at the same time, providing for a positive driving connection at all times. A more specific object resides in the provision of improved differential transmission mechanism in which loss of applicable power upon one of the driven elements is not transmitted to the other, thereby affording an independent positive driving connection to each driven element, while at the same time, providing for the necessary differential speeds of the driven elements. An additional object is the provision of differential drive mechanism of the clutch type, affording a smoother action in the starting and stopping of the motor vehicle, and also eliminating the numerous pinions, side gears, and associated mechanism ordinarily employed in a differential drive. A further object is to provide differential driving mechanism that may be substituted for former types and not require extended alteration for the purpose, and in which the mechanism is located centrally of the rear axle housing, or at an appropriate position between the driven wheels in either a front or rear drive construction.

Other objects will appear hereinafter.

The invention consists in the combinations and arrangements of parts hereinafter described and claimed.

The invention will be best understood by reference to the accompanying drawings forming a part of this specification, and in which:

Fig. 1 is a plan view of a motor vehicle traction assembly showing the driven wheels, axle housing, and improved mechanism of the present invention in position with the upper carrier member removed;

Fig. 2 is a view, partly in section, and partly broken away, of the right driving and driven elements;

Fig. 3 is a face view of either the right or left driving member;

Fig. 4 is a side view of the member shown in Fig. 3;

Fig. 5 is a vertical sectional view taken substantially on the line 5—5 of Fig. 1;

Fig. 6 is a sectional view taken substantially on the line 6—6 of Fig. 5, and showing the driving and driven elements disengaged;

Fig. 7 is an enlarged view similar to the lower cooperating mechanism shown in Fig. 6, with the driving and driven members in engagement;

Fig. 8 is a plan or face view of one of the segmental clutch shoe engaging members preferably employed;

Fig. 9 is a side elevational view of the member shown in Fig. 8; and

Fig. 10 is a sectional view taken substantially on the line 10—10 of Fig. 9.

As illustrated in the drawings, the preferred embodiment of the invention is shown operatively associated with the rear axle of a motor vehicle, although it will be understood that the invention is not necessarily confined to this particular incorporation, but may be embodied in a front axle drive or otherwise.

In the drawings, the mechanism is shown enclosed within the rear axle housing 12, and the differential mechanism is preferably suspended and supported by a carrier 13 secured to the housing 12 by screw bolts 14. A worm gear 15 mounted on a worm shaft 16 is journalled in rear bearing 17 and forward bearing 18 provided in the carrier 13. These parts, in the present embodiment disclosed, are mounted in the carrier member 13, although it will be understood that in the employment of a pinion and ring gear drive, the necessary modifications are made. The forward extremity of the shaft 16 is tapered as at 19, and is adapted to be connected to the main drive shaft of the vehicle. The worm gear 15 meshes with a worm wheel 20, which is centrally mounted in a differential mechanism of the present invention, and inasmuch as wheel 20 is constantly in mesh with worm 15, the wheel member 20 and the parts integrally connected therewith will be referred to as the driving element or elements.

Referring to Fig. 5, a right driving element 21 is mounted on the right side of the worm gear 20 and preferably consists of an inner disk base portion 22, a central actuating portion 23, and an outer reduced hub portion 24. Similarly, a driving element is mounted on the left side of the worm wheel 20 and comprises a base disk portion 25, an actuating portion 26, and a reduced hub portion 27. The right and left hand driving members are secured to the intermediate worm wheel 20 by means of countersunk bolts 28 adapted to pass through both disk portions 22 and 25, as well as the wheel 20, and thus secure these parts together.

The right driving element 21 is enclosed by a driven element 29 having an inner cylindrical clutch drum 30, wall portion 31, and hub 32. Hub 32 is longitudinally slotted to receive the splined extremity 33 of the right axle shaft 34, which is connected to and adapted to drive the right wheel 35 as shown in Fig. 1. In the present embodiment, a full floating type of axle is illustrated, although any suitable driving connection between the axle shaft and the wheel may be employed. Correspondingly, the left driving element or member is enclosed by a left driven element composed of an inner cylindrical drum clutch portion 36, wall 37, and hub 38. Hub 38 is longitudinally slotted to engage the splined end 39 of the left axle shaft 40 connected to the left drive wheel 41.

After the engaging devices hereinafter described are interposed between the actuating portions or members of the respective driving elements and the drums of the driven elements, the right assembly is supported in place by the right bearing cap 42, and the left assembly supported by the left bearing cap 43. Upon positioning of the right roller bearing 44, the adjusting ring 45 is threaded in place and held by lock 46. Correspondingly, a left roller bearing 47 is retained by left adjusting ring 48 threaded in the cap 43 and held by lock 49.

Inasmuch as the elements and devices for bringing about engagement and disengagement between the driving elements and the driven elements are the same on the right and left sides of the intermediate driving gear, except in reverse position, a description of the mechanism for the right assembly will suffice.

As shown in Figs. 3 and 4, the actuating portion of member 23 is triangular in formation to provide a plurality of surfaces 50, which act in operation as camming surfaces as presently described. The points 51 of member 23 are provided with inner fingers 52 and outer fingers 53, and adjacent these finger portions the actuating member is provided with rounded shoulder portions 54. Interposed between the actuating member 23 and the drum 30 are a plurality of segmental gripping or clutch shoes 55, equal in number to the surfaces 50 as shown in Fig. 7. Each gripping or clutch shoe 55 as shown in Figs. 8 and 9 particularly, has an outer arcuate surface 56 adapted when expanded, to grip the inner surface of drum 30 as shown in Fig. 7, and each shoe 55 is provided with inner lugs 57 and outer lugs 58. The end portions of the shoes are brought in abutting relationship as shown in Fig. 6, and when contracted as shown in this position, a pair of complementary inner lugs 57 on the abutting ends of two shoe members are engaged by an inner finger 52 of the actuating member. Similarly, a pair of complementary outer lugs 58 are engaged by an outer finger 53 on the actuating member. It will be noted that the engaging surfaces of the lugs 57 and 58 and the fingers 52 and 53 are rounded, whereby the tendency will be to force the shoe members to contracted position when there is no relative movement as between the driving elements and the driven elements as later explained.

Each shoe member is provided with a recess 59 on the inner surface, which serves to maintain in proper operative position a shoe spreading or expanding member in the form of a roller 60. Thus, in the embodiment disclosed, the expanding rollers 60 are equal to the number of shoe members 55, and also equal in number to the surfaces 50 formed on the actuating portion of the driving element.

Smoothness of operation and engagement and disengagement of the respective shoe members 55 with the clutch drum 30, is enhanced by the provision of leaf spring members 61, which bridge the abutting ends of the shoe members and bear against the adjacent shoulders 54, respectively, on the actuating portion of the driving element. The ends of the leaf springs 61 extend within and are held in place by recessed bosses 62. The abutting ends of the shoe members 55 are provided with semi-cylindrical recesses 63 for the reception of cylindrical aligning keys 64, which serve normally to assist in maintaining the abutting ends of the shoe members in relative alignment, and it will be noted in Fig. 7, that the separation of the adjacent ends of the shoe members 55 when in expanded position, is less than the diameter of the keys 64. To facilitate the description of the operation, by reference to Fig. 5, the left shoe members are numbered 65 and the left shoe expanding rollers 66. Inner movement of the keys 64 is limited by the tapered ends 67 of the recesses 63, to prevent the inner extremities of the keys from riding on the surfaces of the respective disk members 22 and 25.

In operation, the central driving gear which in the present embodiment is the gear wheel 20, rotates integrally with the right and left driving members as described. This causes the wheel 20 normally to rotate in a clockwise direction in the position shown in Figs. 2, 6, and 7, when the vehicle is moving forwardly. When proceeding in a direct line of travel, the right expanding roller 60 and the left expanding rollers 66 roll a slight distance upon the respective adjacent surfaces of the right actuating portion 23 and the left actuating portion 26, respectively, causing the segmental shoe members to be forced outwardly against the right drum 30 and left drum 36, respectively. This action is simultaneous and uniform as between the right and left driving and driven elements, and the power is transmitted to the right axle 34 and the left axle 40, and thence to the wheels 35 and 41. Assuming a curved line of travel to the left is followed as in making a left turn, for example, the right driving and driven elements will assume the positions shown in Fig. 7 while this travel takes place. In making such a change of direction, the driving engagement to the left wheel is not reduced, but the difference in speed between the left wheel and the right wheel is compensated by the right driving and driven mechanism.

Inasmuch as the right wheel 35 is forced to a higher rate of speed, the right axle 34 and the connected drum 30 are likewise rotated at an increased speed in comparison with the speed of rotation of the left drum 36. Hence the right drum 30 as shown in Fig. 7, moves clockwise at a greater speed than the clockwise movement of the central right driving element 21. This causes the shoes 55 to be released by travel of the rollers 60 toward the right on the surfaces 50. When these rollers are in the exact centers of the surfaces 50 between the points 51, the clutch or gripping shoes 55 are contracted or disengaged as shown in Figs. 2 and 6. When this occurs in connection with either the left or right members, free wheeling is provided inasmuch as there is an absence of direct driving engagement. As the right drum 30 continues to rotate clockwise faster than the central element 21, the parts are carried to the position shown in Fig. 7, with the shoe members 55 in engagement with the drum 30, and in this position, the drum is acting as the driving element and the central member 21 as the driven element. However, the wheel cannot lock because the instant there is a reduction in relative movement of the drum 30, the rollers 60 will travel centrally on the surface 50 to release the shoe members 55. Furthermore, the parts are so constructed that there is sufficient clearance to provide for the engaging and disengaging action described in general operation and in making the usual turns.

Assuming the vehicle is travelling down grade, and is inclined to coast at a greater speed than the speed of the motor drive, both the right and left drums 30 and 36 will be rotated faster than the driven elements 21 and 26, respectively, again producing a free wheeling action, and if the difference in this relative speed is sufficient, the right members will assume the position shown in Fig. 7, and the left members a corresponding position so that the speed of the vehicle will be actually retarded by the motor through the driving connection. The springs 61 tend normally to force the shoes outwardly or in expanded position in opposition to the action of the fingers 52 and 53, in cooperation with the lugs 57 and 58. This construction tends to produce a smoother operation in the engagement and disengagement. While the surfaces 50 are flat in the preferred embodiment disclosed, a camming action is produced when the rollers 60 move to either side of a dead center point, because such movement forces the shoes outwardly from the axial center toward the drum 30 as shown in Fig. 7.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. Differential drive mechanism for motor vehicles, comprising a left driving member having a cam surface, a right driving member having a cam surface, a left driven member operatively associated with said left driving member, a right driven member operatively associated with said right driving member, a left engaging member operable by means of said cam surface on said left driving member interposed between said left driving member and said left driven member, a right engaging member operable by means of said cam surface on said right driving member interposed between said right driving member and said right driven member, means for causing engagement and disengagement of said engaging means for differential rotational speeds between said driven members, spring means for normally urging said engaging members into engaging position, and engaging devices mounted on said driven members and said engaging members for retracting the latter upon equalization in speed.

2. Differential drive mechanism for motor vehicles, comprising a left driving member provided with a plurality of cam surfaces, a right driving member provided with a plurality of cam surfaces, a left driven member having a cylindrical drum operatively associated with said left driving member, a plurality of left clutch shoes interposed between the cam surfaces on said left driving member and the drum of said left driven member, a plurality of right clutch shoes interposed between the cam surfaces on said right driving member and the drum of said right driven member, each of said clutch shoes having a roller receiving and positioning recess, a roller positioned in each of said recesses for expanding said shoes upon differential speeds between the driving and driven members, and means mounted upon said clutch shoes and said driving members for normally maintaining said shoes in retracted position.

3. Differential drive mechanism for motor vehicles, comprising a left driving member provided with a plurality of cam surfaces, a right driving member provided with a plurality of cam surfaces, a left driven member having a cylindrical drum operatively associated with said left driving member, a plurality of left clutch shoes interposed between the cam surfaces on said left driving member and the drum of said left driven member, a plurality of right clutch shoes interposed between the cam surfaces on said right driving member and the drum of said right driven member, each of said clutch shoes having a roller receiving and positioning recess, a roller positioned in each of said recesses for expanding said shoes upon differential speeds between the driving and driven members, means mounted upon said clutch shoes and said driving members for normally maintaining said shoes in retracted position, and shoe aligning pins interposed between the adjacent ends of said clutch shoes.

4. Differential drive mechanism for motor vehicles, comprising a left driving member provided with a plurality of cam surfaces, a right driving member provided with a plurality of cam surfaces, a left driven member having a cylindrical drum operatively associated with said left driving member, a plurality of left clutch shoes interposed between the cam surfaces on said left driving member and the drum of said left driven member, a plurality of right clutch shoes interposed between the cam surfaces on said right driving member and the drum of said right driven member, each of said clutch shoes having a roller receiving and positioning recess, a roller positioned in each of said recesses for expanding said shoes upon differential speeds between the driving and driven members, lug members mounted on said clutch shoes, and finger members mounted upon said driving members and adapted to engage said lug members to force said shoes to contracted position when there is no relative movement between said driving members and said driven members.

5. Differential drive mechanism for motor vehicles, comprising a left driving member provided with a plurality of cam surfaces, a right driving member provided with a plurality of cam surfaces, a left driven member having a cylindrical drum operatively associated with said left driving member, a plurality of left clutch shoes interposed between the cam surfaces on said left driving member and the drum of said left driven member, a plurality of right clutch shoes interposed between the cam surfaces on said right driving member and the drum of said right driven member, each of said clutch shoes having a roller receiving and positioning recess, a roller positioned in each of said recesses for expanding said shoes upon differential speeds between the driving and driven members, lug members mounted on said clutch shoes, finger members mounted upon said driving members and adapted to engage said lug members to force said shoes to contracted position when there is no relative movement between said driving members and said driven members, and shoe aligning pins interposed between the adjacent ends of said clutch shoes.

6. Differential drive mechanism for motor vehicles, comprising a left driving member having a cam surface, a right driving member having a cam surface, a left driven member operatively associated with said left driving member, a right driven member operatively associated with said right driving member, a left engaging member operable by means of said cam surface on said left driving member interposed between said left driving member and said left driven member, a right engaging member operable by means of said cam surface on said right driving member interposed between said right driving member and said right driven member, operating rollers interposed between said cam surface and said engaging members for causing engagement of the latter upon differential rotational speeds between said driving and driven members, and means for causing retraction and disengagement of said engaging members upon equalization in speed as between said driving and driven members.

7. Differential drive mechanism for motor vehicles, comprising a left driving member having a cam surface, a right driving member having a cam surface, a left driven member operatively associated with said left driving member, a right driven member operatively associated with said right driving member, a left engaging member operable by means of said cam surface on said left driving member interposed between said left driving member and said left driven member, a right engaging member operable by means of said cam surface on said right driving member interposed between said right driving member and said right driven member, operating rollers interposed between said cam surface and said engaging members for causing engagement of the latter upon differential rotational speeds between said driving and driven members, means for causing retraction and disengagement of said engaging members upon equalization in speed as between said driving and driven members, and means restricting relative movement between said rollers and the associated engaging members.

8. Differential drive mechanism for motor vehicles, comprising a left driving member having a cam surface, a right driving member having a cam surface, a left driven member operatively associated with said left driving member, a right driven member operatively associated with said right driving member, a left engaging member operable by means of said cam surface on said left driving member interposed between said left driving member and said left driven member, a right engaging member operable by means of said cam surface on said right driving member interposed between said right driving member and said right driven member, each of said engaging members having a roller receiving and positioning recess, a roller positioned in each of said recesses to cooperate with the cam surface on the associated driving member for expanding said engaging members upon differential speeds between the driving and driven members, and means for retracting said engaging members upon equalization in speed between said driving and driven members.

In testimony whereof I have signed my name to this specification.

OTIS E. LAW.